United States Patent [19]

Kasten

[11] Patent Number: 5,740,351
[45] Date of Patent: Apr. 14, 1998

[54] APPARATUS AND METHOD FOR DEBUGGING/MODIFYING ROM-BASED SOFTWARE SYSTEMS EMPLOYING AND EXTENSIBLE INTERPRETER

[75] Inventor: Philip S. Kasten, Nashua, N.H.

[73] Assignee: Lucent Technologies Inc., Murray Hill, N.J.

[21] Appl. No.: 527,463

[22] Filed: Sep. 13, 1995

Related U.S. Application Data

[63] Continuation of Ser. No. 968,024, Oct. 29, 1992, abandoned.

[51] Int. Cl.$^6$ .......................... G06F 11/00; G06F 9/445
[52] U.S. Cl. ........................ 395/183.11; 395/705
[58] Field of Search .................. 395/183.01, 183.02, 395/183.03, 183.06, 183.14, 183.22, 183.11, 705, 710; 364/280, 280.2, 280.4, DIG. 4

[56] References Cited

U.S. PATENT DOCUMENTS

| | | | |
|---|---|---|---|
| 4,312,066 | 1/1982 | Bartz et al. | 371/16.1 |
| 4,589,068 | 5/1986 | Heinen, Jr. | 364/200 |
| 4,719,564 | 1/1988 | Hara | 364/200 |
| 4,819,234 | 4/1989 | Huber | 371/19 |

OTHER PUBLICATIONS

European Search Report, dated Dec. 30, 1993, regarding EPO Application Number EP 93 30 8344.
Software Practice & Experience, vol. 20, No. 5, May 1990, entitled "A Symbolic Debugger for Real–Time Embedded Ada Software", by Dan Lyttle et al.
IBM Technical Disclosure Bulletin, vol. 28, No. 6, p. 2637, dated Nov. 1985, entitled "Realtime debugging operation".
Patent No. 4,607,332, filed on Jan. 14, 1983 and issued on Aug. 19, 1986 to Edward S. Goldberg, Class: 364/300.

*Primary Examiner*—Hoa T. Nguyen

[57] ABSTRACT

Debugging and/or modifying of ROM-based embedded software systems is realized by advantageously employing an extensible interpreter and inserting requests for "Customizable Call-Outs" (CCOs) throughout the ROM-based embedded software. Then, the ROM-based embedded software system can easily be directly enhanced, i.e., extended, at run time to provide virtually limitless new functionality. Advantages of the invention are that the ROM-based embedded system software does not need to be rebuilt or reloaded, and the functionality of the debugging/modifying software is decided at the time of detecting a problem and/or of providing a modification, not before. By employing the extensible interpreter, the extension to the ROM-based embedded software is implemented, i.e., written and loaded, in the system directly, without the need for or use of an additional external computer platform or compiler.

10 Claims, 3 Drawing Sheets

APPARATUS AND METHOD FOR DEBUGGING/MODIFYING ROM-BASED SOFTWARE SYSTEMS EMPLOYING AND EXTENSIBLE INTERPRETER

This application is a continuation of application Ser. No. 07/968,024, filed on Oct. 29, 1992, now abandoned.

TECHNICAL FIELD

This invention relates to debugging and/or modifying of software systems and, more particularly, to debugging and/or modifying of read-only-memory (ROM)-based Embedded Software Systems.

BACKGROUND OF THE INVENTION

Debugging and/or modifying of ROM-based Embedded Software Systems is often difficult. Once a system is operating out of ROM, its program is fixed. When a problem arises, a developer and/or debugger often needs to rely on special external hardware and software to determine the cause of the problem, or must rely on some predetermined test software that is also embedded into the system. The problems with the first approach are numerous: the external equipment is usually not available at the equipment site where the problem has occurred; external equipment is costly, etc. The problems with the latter approach are also numerous: embedded test/debugging code is only anticipatory in nature (a developer can only guess, at the time of the development, what the monitor/debug software should do); embedded test/debug code takes up space in the product. Many times, the system has a built-in monitor/debugger—one that is general purpose but allows only for hexadecimal data dumping, single stepping, etc. and has no knowledge of the data structures and/or architecture of the software system. If the embedded test/debug software proves to be inadequate, a new software load must be built with added functionality and reloaded into the system. Such an approach is often time consuming and costly.

One known arrangement for dynamic alteration of firmware programs in ROM-based systems is disclosed in U.S. Pat. No. 4,607,332, issued on Aug. 19, 1986 to E. S. Goldberg. However, this arrangement requires the use of external computing platforms and/or compilers to implement a suitable software replacement for the ROM-based embedded software to be modified. Consequently, the developer/debugger needs to have access to such additional computing and compiling equipment which may not be available at the site where the ROM-based embedded software system resides.

SUMMARY OF THE INVENTION

The problems of prior known debugging/modifying software systems for so-called ROM-based embedded software systems are overcome, in accordance with the principles of the invention, by advantageously employing an extensible interpreter and inserting requests for "Customizable Call-Outs" (CCOs) throughout the ROM-based embedded software. Then, the ROM-based embedded software system can easily be directly enhanced, i.e., extended, on-site at run time to provide virtually limitless new functionality via extension. Advantages of the invention are that the ROM-based embedded system software does not need to be rebuilt or reloaded, and the functionality of the debugging/modifying software is decided at the time of detecting a problem and/or of providing a modification, not before. Additionally, by employing the extensible interpreter, in accordance with the invention, the extension to the ROM-based embedded software is implemented, i.e., written and loaded, in the system directly without the need for or use of an additional external computer platform or compiler.

DETAILED DESCRIPTION

Figure 1:
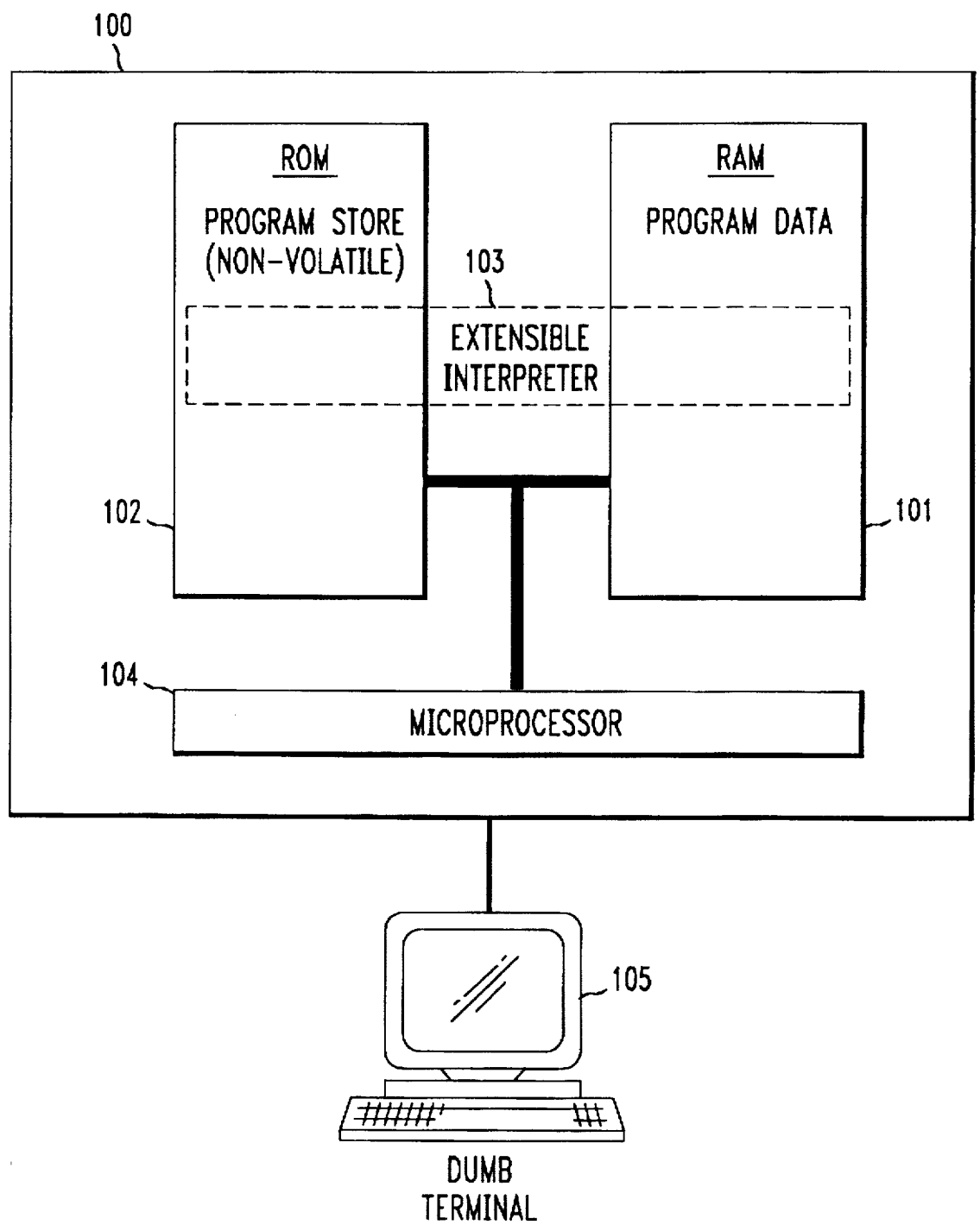
FIG. 1 shows, in simplified form, a system arrangement employing the invention.

FIG. 1 shows, in simplified form, system 100 including an embodiment of the invention. Specifically, system 100 includes random-access-memory CRAM) 101, read-only-memory (ROM) 102, Extensible Interpreter 103, microprocessor 104 and so-called "dumb" terminal 105. Note that Extensible Interpreter 103 is employed to implement the invention and is shown as residing both in RAM 101 and ROM 102. An Extensible Interpreter which may be used as 103 in this implementation of the invention is a modified Forth-83 Standard implementation of the Forth programming language, as described below. The Forth programming language is well known, see for example the book entitled "Starting Forth", Leo Brodie, Prentice Hall, Inc., 1981. System 100 represented in this embodiment is an embedded software system—its primary system software is fixed in ROM 102. Note that although this embodiment of the invention is described in the context of a single program, it is to be understood that the principles of the invention are equally applicable to a software architecture composed of a multitasking operating system and a multitude of tasks.

Figure 2:
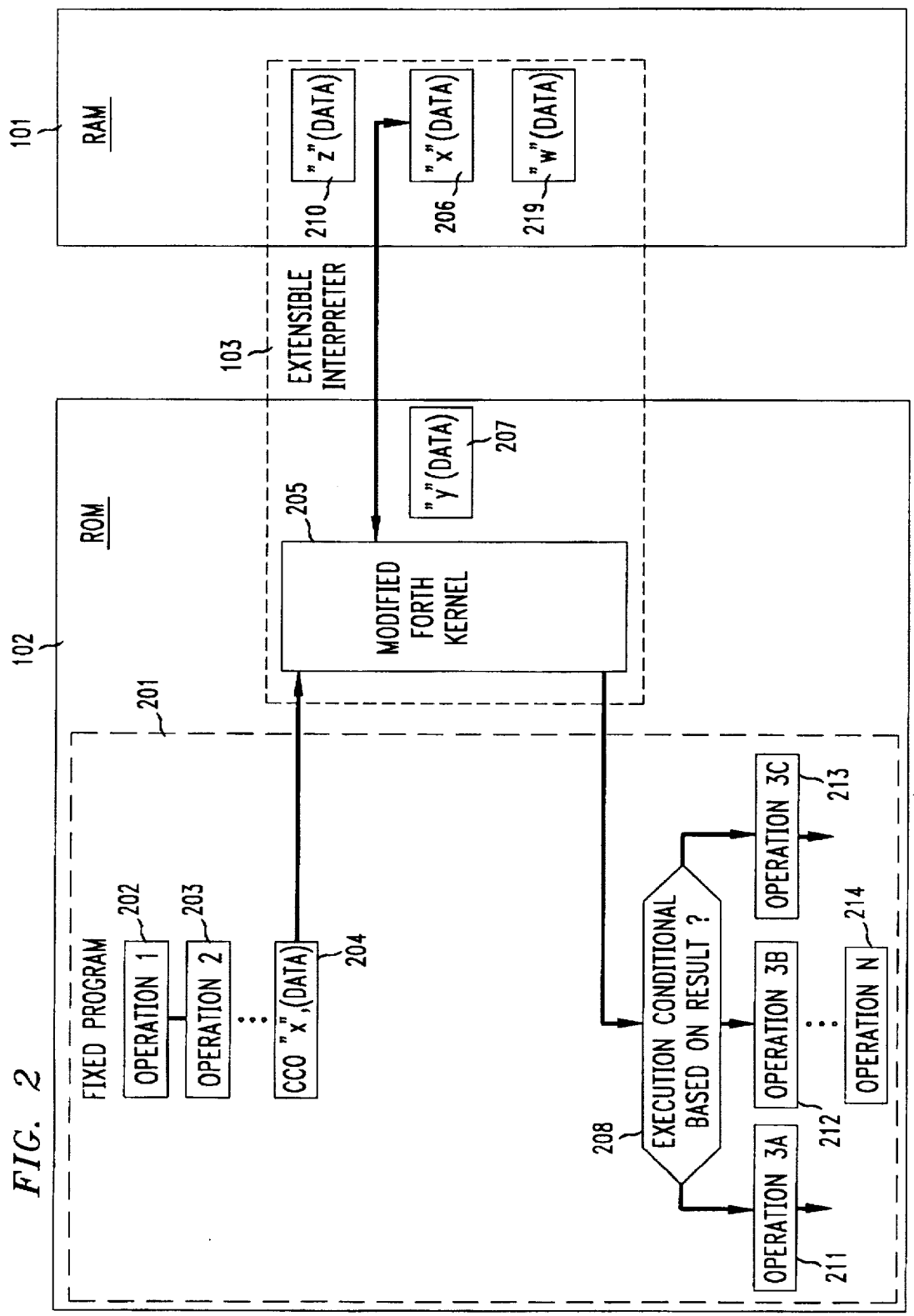
FIG. 2 is a flowchart illustrating the operation of the invention.

FIG. 2 illustrates, in simplified fashion, the operational aspects of the invention. Specifically, ROM 102 is shown to include the embedded fixed equipment system program 201, and portions of extensible interpreter 103, namely, modified Forth kernel 205 and defined CCO "y"(DATA) 207. RAM 201 also includes portions of extensible interpreter 103, in this example, defined CCOs "x"(DATA) 206, "w"(DATA) 209 and "z"(DATA) 210. It is noted that the notation "x"(DATA) is used to indicate a call to a logical function "x", passing to it some (possibly no) parameters.

Fixed equipment system program (hereafter "fixed program") 201 includes "normal" operation steps of the fixed program and includes steps to effect the principles of the invention by causing attempts to invoke so-called "Customizable Call-Outs" (CCO). For example, operation 1, step 202, operation 2, step 203 through operation N step 214 are the so-called "normal operation steps". Also included in fixed program 201, in accordance with the principles of the invention, is a request for CCO "x"(DATA) 204. It is noted that although only one CCO request is shown in fixed program 291 in this example, any number of requests for CCOs can be inserted at desired locations as determined by the implementor. Also included in fixed program 201 is an execution conditional based on result step 208, which execution of is dependent on the result of the particular CCO that is being attempted to be invoked. Dependent on the CCO being in existence and invoked, step 208 can execute any desired number of operations, for example, operation 3A (211), operation 3B (212) or operation 3C (213). Operation 3B (212) may in this example, be the operation in fixed program 201, which would be effected if CCO "x"(DATA) 204 was not defined. Similarly, either operation 3A (211) or operation 3C (213) could be executed if CCO "x"(DATA) 206 in RAM 101 is defined and returns certain result values, as will be described below. It will be apparent that any number of program steps may be defined by a particular CCO and that the fixed program 201 may be re-entered at any specifically defined program step. It should be noted that when fixed program 201 is being written, it is most likely unknown what function "x"(DATA) will provide; indeed, "x"(DATA) may not even be in existence. Fixed program 201 only has this so-called "hook", i.e., request for CCO "x"(DATA) 204 in place. When request for, CCO "x" (DATA) 204 is entered in fixed program 201, extensible interpreter 103 and therein modified Forth kernel 205 determines, in accordance with the principles of the invention, if CCO "x"(DATA) exists (either in RAM 101 or ROM 102). In this example, "x"(DATA) 206 is present in RAM 101. Since "x"(DATA) 206 exists, it is executed in RAM 101, and can set result values. Subsequently, control is returned to modified Forth kernel 205 which then, in turn, returns to fixed program 201, specifically, step 208. If, for example, "x"(DATA) did not exist, either in RAM 101 or ROM 102, control would be returned to the fixed program 201 and therein via step 208 to execute the "normal" fixed program operation, for example, operation 3B (212). Details of modified Forth kernel 205 and its operation are described below in relation to FIG. 3. It is noted that at any instant in time, there may be any number, (including 0) of CCOs actually defined; some CCOs may be in ROM 101, as is "y"(DATA) 207 and some may be in RAM 101, as for example, "x"(DATA) 206, "w"(DATA) 209 and "z"(DATA) 210. Additionally, it should be noted that there will most likely be at least one CCO defined in fixed program 201, for example, "y"(DATA) 207. This at least one defined CCO is to be used to allow a user to interact with extensible interpreter 193, allowing for the definition of CCOs based in RAM 101 via modified Forth kernel 205. The extensible interpreter 103 allows for the direct, on-site implementation of CCOs, thereby providing unlimited new functionality via extension of fixed program 201, without the need of additional external computer platforms and/or compilers.

Figure 3:
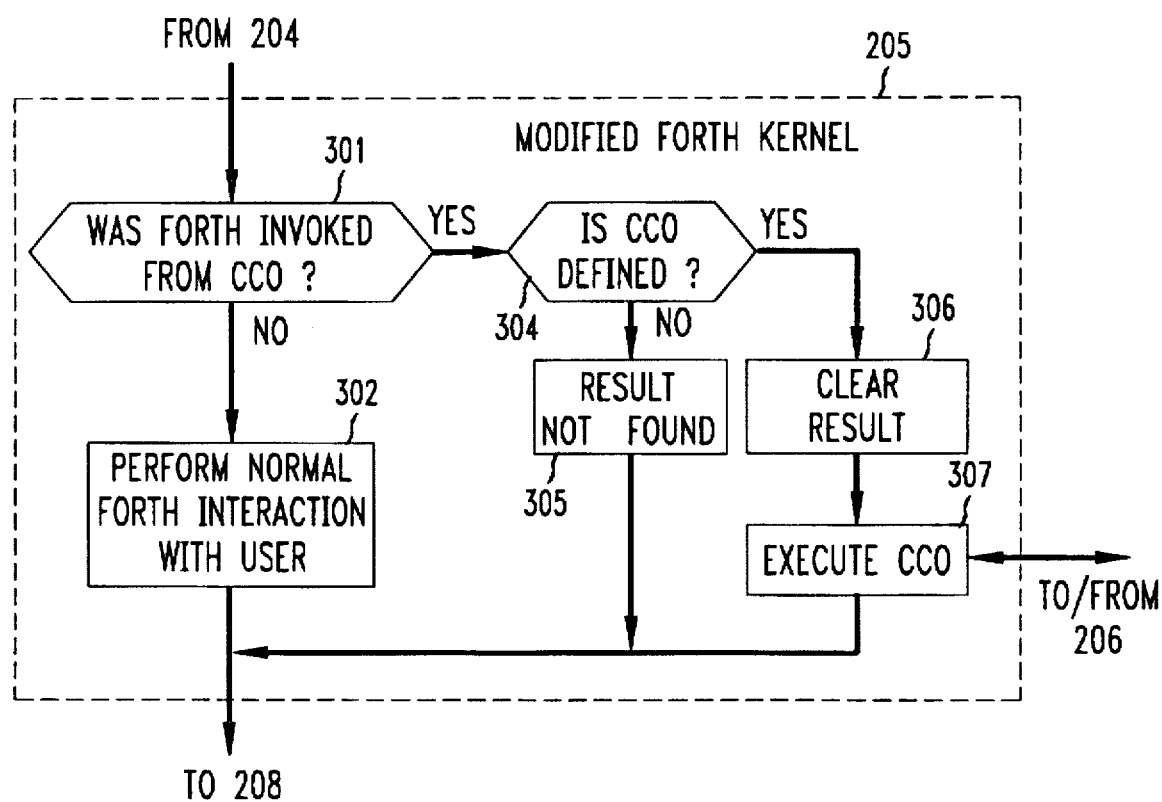
FIG. 3 illustrates a modification to a FORTH kernel employed in an exemplary embodiment of the invention.

FIG. 3 is a simplified flow chart illustrating the operational steps of modified Forth kernel 205 of FIG. 2. Again, as indicated above, the Forth programming language is well-known in the art. It is noted in this example that modified Forth kernel 205 is entered via CCO request for "x"(DATA) 204 of FIG. 2. However, the Forth kernel may also be invoked via terminal 105 (FIG. 1). Accordingly, conditional branch point 301 tests to determine whether Forth was invoked from the CCO. If the test result is no, step 302 causes the arrangement to perform normal Forth interaction with the user via terminal 105. This interaction allows a user, among other things, to define CCOs written in the Forth language to extend the extensible interpreter 103 in RAM 101. If the test result in step 301 is yes, Forth was invoked from CCO "x"(DATA) 204 and conditional branch point 304 tests to determine if the CCO is defined. If the test result in step 304 is no, the CCO is not (yet) defined and step 305 indicates that a result value of "NOT FOUND" is returned to fixed program 201 and specifically, step 208. As indicated above, since the CCO is not defined, fixed program 201 will effect its so-called "normal" program step, in this example, operation 3B (212). If the test result in step 304 is yes, step 306 clears any prior result. Thereafter, step 307 executes the particular CCO. (In this example, CCO "x" (DATA) 206 in RAM 102.) The CCO can set a result value which may be used by the invoking fixed program allowing for execution conditional on result step 208. Once executed, control is returned to step 307 and thereafter, to step 208 in fixed program 201 (FIG. 2). Execution conditional based on result step 208 is effective to execute any number of operations, depending on the operations defined in "x" (DATA) 206. In this example, either of operations 3A (211) or 3C (213). After performing the particular defined operations, the fixed program may be entered at another operational step, also defined in the particular CCO. Again, it should be noted that the particular program defined in a particular CCO is a user-entered Forth program; as such, it is fully customizable at the desired time of entering it while the equipment system software is running without the need of additional external computing platforms and/or compilers.

Briefly, in the following example, it is noted that in procedural program languages such as the well-known C programming language, programs are composed of a series of functions, each possibly being called with arguments or parameters. Validation of these parameters in some cases is non-trivial and may be very time consuming. Therefore, it is often undesirable to have all of the functions each perform its own validation of its input parameters since such validation will possibly impact system performance and most often, have the result of indicating that the parameters are valid. In other words, with parameter validation built into the program, the validation algorithms will be running all the time, although it is very likely that the parameters are valid. However, without employing such parameter validation, it is difficult to quickly identify when and how parameters are being passed in the program incorrectly. In the past, embedded systems software that contained no validation algorithm would need to be rebuilt and reloaded into the particular equipment once such validation algorithms were added. Customizable Call-Outs (CCOs) provide, in accordance with the principles of the invention, a more convenient, feasible .and time/cost effective method of validation. Specific functions would each invoke a unique CCO. Normally, these CCOs would not be defined, allowing the fixed program to run without any impact on its performance. Should a time arise when it is desirable to introduce validation of the parameters of one or more functions, those CCOs would be defined at that time (while the product is still operative and running the fixed program).

Additionally, since the CCOs to perform the desired validations are added as needed, they can operate in a much more intelligent and well defined manner than if such validation procedures were inserted in the fixed program 201 during the initial development. By way of example, if it is found that every fifth time a certain function's parameter is passed with a value of 10 and the parameter should really have a value of 12, the validation process added by a CCO can provide for this. Such insight into bugs in software is difficult to have when developing the original program; indeed, if such were the case, the bug wouldn't be there in the first place. After the system is debugged employing the CCOs in operations of the invention, and the fixes have been proven, then a single rebuild and reload of the equipment fixed program 201 is all that is required.

The following is a C-language source code implementation of the above example.

```
/* Simple example of a C function using a CCO for input parameter validation */
int Simple function(param1, param2) long param1; long param2; {
   struct {long *p1; long *p2} params;
   params.p1=¶m1;
   params.p2=¶m2;
   CCO("validation",&params);
   do_more_stuff( );/*
   .
   .
   .
   . */}
```

The following is the definition of a CCO in the Forth-language for the above example.
(Simple example of a Forth program implementing the above "validation" CCO)

```
variable count
: validation
param1 )
        (have the value 10, change it to the value 12).
    @ 10 = if
        1 count +! count @ 4 = if
        12 get_CCO_data @ !
        ( ) count !
        then
        then
    get_CCO_data 4 + @ ( Check param2. If its value is greater than 20, )
        ( print an error message. )
    @ 20 > if
    ."Parameter 2 is too big!" CR
    then ;
```

Another powerful capability introduced by this invention is the ability to define software breakpoints. For example, if the developer wished to have the above system stop executing all but a Forth-based debugger, if parameter 2 is too large, the following CCO could be defined:

```
: validation
    get_CCO_data 4 + @ ( Check param2. If its value is greater than 20, )
        ( perform a software breakpoint. )
    @ 20 > if
    ."***breakpoint" abort
    then ;
```

In the above example, the well defined Forth word "abort" is used to implement the breakpoint.

It is important to stress that the complexity of the CCO is NOT in the original equipment system software and is NOT built into the equipment system software embedded in ROM 102. The CCOs are added only at run time, only when necessary, only with the functionality needed to implement the desired task and without the need for an additional external computer platform and/or compiler.

The above-described arrangements are, of course, merely illustrative of the principles of the invention. Other arrangements may be devised by those skilled in the art without departing from the spirit or scope of the invention.

I claim:

1. A method for dynamically modifying a read-only-memory "ROM"-based embedded software system, said system including a ROM for storing a fixed equipment system program and a Random Access Memory (RAM) for storing data, said method comprising the steps of:
   executing the fixed equipment system program, said fixed equipment system program including at least one request for a Customized Call-Out (CCO) from the ROM-based embedded software system; and
   invoking at least one dynamic extension to the fixed equipment system program by
   (1) transferring control of the ROM-based software system from said fixed equipment system program to an extensible interpreter program embedded in the ROM by executing the request for a Customizable Call-Out (CCO) during said executing step and, upon executing the request for a Customizable Call-Out (CCO), passing the identity of the CCO to the extensible interpreter program, and
   (2) executing the identified CCO by the extensible interpreter program to allow modification in the RAM of the capabilities of the ROM-based embedded software system in accordance with the identified CCO.

2. The invention as defined in claim 1 wherein said extensible interpreter program is further employed to directly execute a CCO request without the need for an additional external computer platform and/or compiler.

3. The invention as defined in claim 1, wherein each said request for a CCO defines a software breakpoint in the fixed equipment software program.

4. The invention as defined in claim 3 wherein said extensible interpreter program is implemented in Forth program language.

5. In an equipment arrangement including a read-only-memory (ROM), a random-access-memory (RAM), a microprocessor and a terminal wherein requests for Customizable Call-Outs (CCOs) are inserted at strategic locations in a fixed equipment ROM software program of a ROM-based embedded software system, a method for dynamically modifying the ROM-based software system comprising the steps of,
   (1) requesting a CCO during the execution of the fixed equipment software program and upon executing the request for the CCO in the fixed equipment software program, transferring control of the ROM based software system from the fixed equipment software program to an extensible interpreter program embedded in the ROM and passing to the extensible interpreter program the identity of the requested CCO,
   (2) determining via the extensible interpreter program if the identified CCO is implemented,
   (3) proceeding to step (4) if the identified CCO is implemented, otherwise returning control of the ROM-based software system to the fixed equipment software program, and
   (4) executing the identified CCO by the extensible interpreter program so that the capabilities of the ROM-based software system may be modified in the RAM in accordance with the implementation of the identified CCO.

6. The invention as defined in claim 5 wherein said extensible interpreter program resides in the ROM and in the RAM.

7. The invention as defined in claim 6 wherein there is a CCO in the non-interpretive ROM-based embedded software system for enabling interaction with the extensible interpreter program via the microprocessor and terminal in order to implement directly at least one new CCOs to extend the extensible interpreter program in the RAM, i.e., the at least one new CCOs is implemented in the RAM via the extensible interpreter program, without the need of an additional external computer platform and/or compiler.

8. The invention as defined in claim 7, wherein said extensible interpreter program can invoke said one or more new CCOs upon corresponding requests for CCOs being executed in the fixed equipment software program and the identities of those one or more new CCOs being transferred to the extensible interpreter program.

9. The invention as defined in claim 8, wherein said extensible interpreter program is further employed to implement software breakpoints in the fixed equipment software program.

10. The invention as defined in claim 9 wherein said extensible interpreter program is implemented in Forth program language.

* * * * *